United States Patent [19]

Umemoto et al.

[11] Patent Number: 4,716,986

[45] Date of Patent: Jan. 5, 1988

[54] VIBRATION DAMPING SYSTEM

[75] Inventors: Tadahiro Umemoto; Hiroe Kobayashi, both of Yokohama, Japan

[73] Assignee: Ishikawajima-Harima Jukogyo Kabushiki Kaisha, Tokyo, Japan

[21] Appl. No.: 785,161

[22] Filed: Oct. 7, 1985

[51] Int. Cl.$^4$ ............................................... F16F 7/00
[52] U.S. Cl. ................................... 181/207; 181/290; 248/610
[58] Field of Search ................................ 181/207–209, 181/290; 248/634, 636, 638, 562, 610–612, 630

[56] References Cited

U.S. PATENT DOCUMENTS

| 3,386,527 | 6/1968 | Daubert et al. | 181/208 |
| 4,346,782 | 8/1982 | Bohm | 181/207 |
| 4,392,681 | 7/1983 | Raquet | 181/209 X |
| 4,488,619 | 12/1984 | O'Neill | 181/290 |

Primary Examiner—Benjamin R. Fuller

[57] ABSTRACT

The invention provides a vibration damping system in which a vibration damper made of materials which have different degrees of plastic deformation and which are integrally or unitarily joined is interposed between an equipment to be vibration-damped and a support for supporting the equipment.

21 Claims, 24 Drawing Figures

VIBRATION DAMPING SYSTEM

BACKGROUND OF THE INVENTION

The present invention relates to a vibration damping system used to absorb and damp the vibrations due to earthquakes of pipelines, pumps, or other machinery and structures, the vibrations due to flowing fluids and the vibrations of engines and turbines.

Vibration damping systems used in nuclear power plants or chemical plants must provide not only a function of permitting thermal displacement of an equipment to be vibration-damped so as to protect it but also a function of suppressing sudden vibrations such as earthquakes.

Conventional vibration damping systems having the above-described two functions are oil snubbers, oil dampers and mechanical snubbers.

Figure 1:
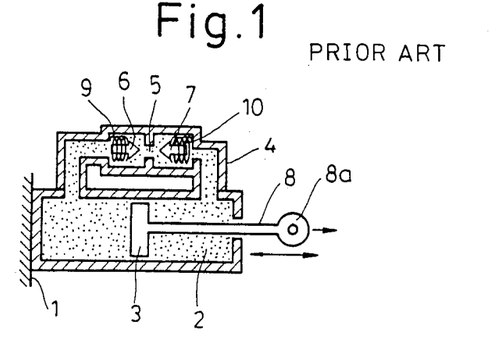
FIG. 1 is a sectional view of an oil snubber.

Oil snubbers and oil dampers are devices utilizing hydraulic pressure in which, as shown in FIG. 1, a cylinder 2 is securely mounted on a stationary support 1 and a piston 3 is inserted into the cylinder 2 which is filled with an oil. The right and left cylinder spaces of the cylinder 2 divided by the piston 3 are intercommunicated through a pipe 4 with a restriction 5 and poppets 6 and 7 disposed on both sides of the restriction 5. A fee end 8a of the piston rod 8 is connected to an equipment to be vibration-damped (that is, various devices, equipment, strustures and pipelines whose vibrations must be suppressed and damped). Springs 9 and 10 are disposed to normally urge the poppets 6 and 7, respectively, away from the restriction 5. When the hydraulic pressure in the cylinder 2 is decreased (that is, when the movement of the piston 8 is slowed down), the poppets 6 and 7 are urged away from the restriction 5 so that the resistance of the fluid passage can be decreased. When the equipment to be vibration-damped vibrates and the piston 3 is caused to move, the poppet 6 or 7 closes the restriction 5 so that the displacement of the piston 3 is suppressed to suppress vibrations. However, the device or system described above has the disadvantages: (1) that inspection is needed because of the leakage of working oil during use: (2) that the device is heavy in weight: (3) that the device is complex in construction and therefore very expensive in cost and constant maintenance works are needed because of very frequently break-downs: and (4) that the vibration damping device cannot support itself.

Figure 2:
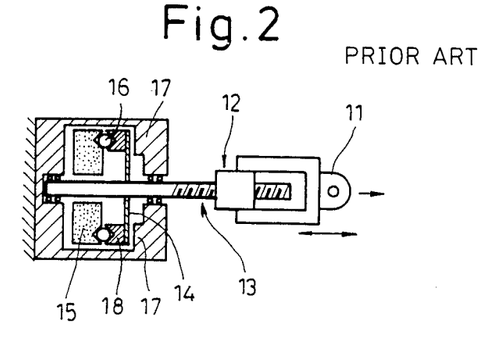
FIG. 2 is a sectional view of a mechanical snubber.

Mechanical snubbers mechanically damp vibrations in which, as shown in FIG. 2, a ball nut 12 is securely attached to a load column 11 to which is connected an equipment to be vibration-damped, and is threadably engaged with a ball screw 13 so that reciprocal linear movement of the equipment to be vibration-damped is converted into rotary movement of the ball screw 13. A a disk spring 14 is securely attached to the end portion of the ball screw 13 and the time lag between the disk spring 14 and a flywheel 15 rotatably mounted is utilized to produce braking action due to the contact between a brake shoe 17 and a brake disk 18, thereby stopping the rotation of the ball screw 13. This device is further provided with balls 16. The above-described construction is substantially similar to that of a disk brake which is actuated in response to an acceleration so that no braking action is produced in response to the slow movement of the equipment to be vibration-damped and almost no resisting force is produced. The mechanical snubber of the type described has no problem of the leakage of working oil, but it still cannot solve the other disadvantages ((2)–(4) described above) of the oil snubbers.

The present invention was made to overcome the above and other problems encountered in the conventional vibration damping systems and has for its object to provide a vibration damping systems which can substantially overcome various defects due to the complicated construction of the conventional oil snubbers and mechanical snubbers; which can improve reliability in operation by eliminating the leakage of working oil, sticking (the phenomenon that the device cannot move) and other defects; which can substantially eliminate maintenance works; which can be made light in weight and compact in size so that the manufacturing costs can be reduced; and which is provided with a mechanism capable of positively absorbing the vibration energy.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 1 and 2 are views used to explain the conventional vibration damping systems, respectively;

FIGS. 3 and 4 are views used to explain a first embodiment of a vibration damping system in accordance with the present invention;

FIGS. 9 and 10 are views used to explain a third embodiment of the present invention;

FIGS. 12 and 13 are views used to explain a fifth embodiment of the present invention;

DETAILED DESCRIPTION OF THE PREFERRED EMBODIMENTS

Figure 3:
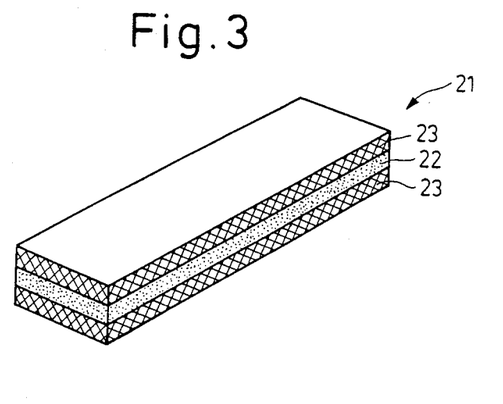
FIG. 3 is a perspective view of a vibration damper.
Figure 4:
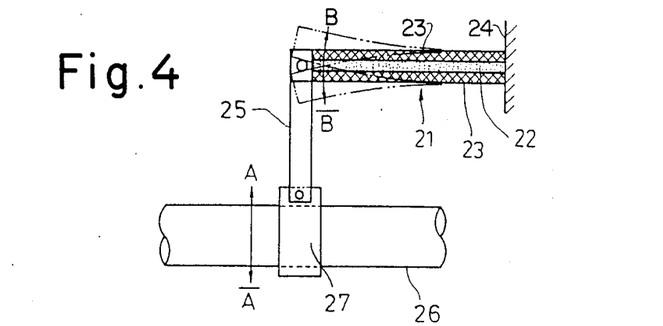
FIG. 4 is a side view showing the mounting of the damper shown in FIG. 3.

Referring first to FIGS. 3 and 4, a first embodiment of the present invention will be described. As best shown in FIG. 3 a vibration damper 21 comprises an intermediate member 22 and reinforcing members 23 which securely sandwich the intermediate member 22 integrally. As shown in FIG. 4, one end of the damper 21 is securely jointed to a support 24 such as a building, a foundation or the like while the other end is connected through a connecting member 25 to a clamp 27 which in turn supports an equipment 26 to be vibration-damped 26 such as a pipe.

In order to bond the reinforcing members 23 to the intermediate member 22, various methods may be employed. For instance, the whole surfaces of the reinforcing members 23 are bonded to the whole major surfaces of the intermediate member 22 by explosion bonding; the reinforcing members 23 are welded to the intermediate member 22; or the reinforcing members 23 are securely joined to the intermediate member 22 by brazing, diffusion bonding, rolling or with an adhesive.

The intermediate member 22 is made of a material such as a leaf spring having a high degree of mechanical strength. When the equipment 26 to be vibration-damped is a pipe which is long and extends horizontally, the intermediate member 22 extends in parallel with the axis of the pipe 26 and is permitted to make the vertical movement or swing as indicated by two-dot lines in FIG. 4.

The reinforcing members 23 serves to suppress the vertical swing of the intermediate member 22 by their plastic deformations. They are made of superplastic material such as Zn-Al Sn-Bi.

The vibration damping system is so disposed as to interconnect between the support 24 and the equipment 26 to be vibration-damped and permits thermal movement of the equipment 26 to be vibration-damped. Furthermore, in the case of sudden vibrations of the equipment 26 to be vibration-damped, the vibration damping system can absorb the vibration energy of the equipment 26 to be vibration-damped and thereby damp its vibrations.

Figure 5:
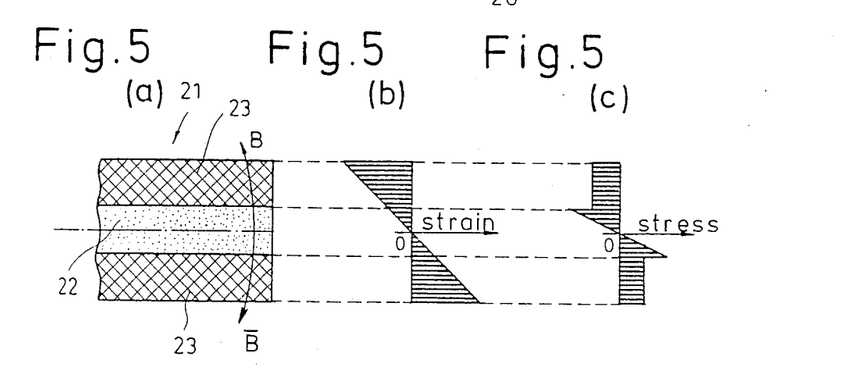
FIG. 5(a) is an enlarged view of one end of the damper shown in FIG. 3.
FIG. 5(b) is a view used to explain the magnitudes of strains at various positions in the directions of oscillation of the damper.
FIG. 5(c) is a view used to explain a stress distribution.

More particularly, when an external force such as an earthquake is exerted to the equipment 26 to be vibration-damped so that the equipment 26 is caused to vibrate in the vertical direction as indicated by the double-pointed arrow A—A in FIG. 4, the vibration damper 21 is caused to vertically swing as indicated by the double-pointed arrow B—B so that the intermediate member 22 is caused to bend upward and downward, resulting in the plastic deformations of the reinforcing member 23. The plastic deformations of the reinforcing members 23 absorb the displacement (vibration) energy of the equipment 26 to be vibration-damped. FIGS. 5(b) and 5(c) show the magnitude of strain and the stress distribution at various points in the direction of vibration B—B of the vibration damper 21 shown in FIG. 5(a).

Figure 6:
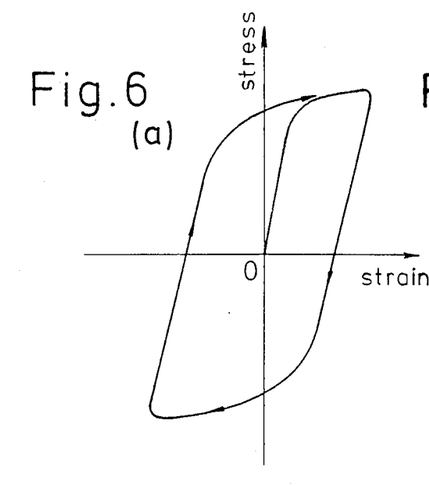
FIG. 6(a) is the strain-stress diagram of a reinforcing member of the damper shown in FIG. 3.
FIG. 6(b) is the strain-stress diagram of an intermediate member of the damper shown in FIG. 3.

The magnitude of the energy absorbed by the deformations of the intermediate member 22 and the reinforcing members 23 is in proportion to the product of the plastic deformations of the reinforcing members 23 and the stresses caused when the reinforcing members 23 are plastically deformed. For instance, when the equipment 26 is vertically vibrated, the energy absorbed is in proportion to the area surrounded by the hysteresis loop shown in FIG. 6(a). The intermediate member 22 is repeatedly elastic deformed in pluse and minus directions along the line as indicated by solid line in FIG. 6(b). The deformation of the intermediate member 22 does not absorb the energy.

Figure 7:
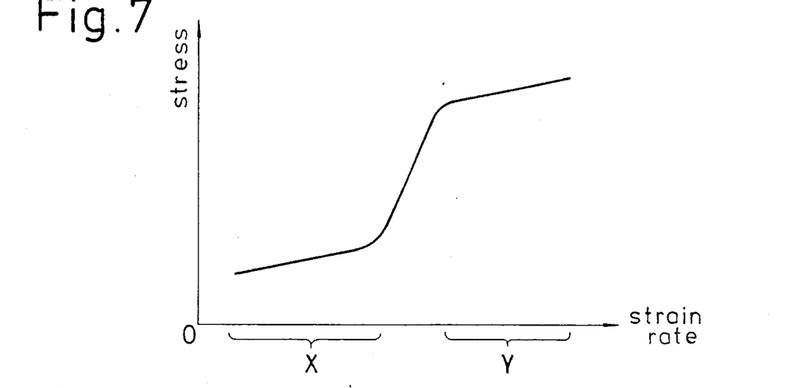
FIG. 7 is the diagram showing the relationship between the stress and the strain velocity of the reinforcing member of the damper shown in FIG. 3.

Meanwhile, since the reinforcing members 23 are made of a superplastic material, the stresses produced in the reinforcing members 23 vary in response to the strain rate (the displacement rate) of the equipment 26 to be vibration-damped as shown in FIG. 7. It is seen that in the range X of the strain rate being low, the stresses produced in the reinforcing members 23 are small; but in the range Y of the strain rate being high, the stresses become also high.

It follows therefore that when the slow movement such as thermal movement of the equipment 26 to be vibration-damped occurs, the stresses or reaction forces produced in the reinforcing members 23 are low so that the displacement of the equipment 26 to be vibration-damped is permitted. On the other hand, when the equipment 26 to be vibration-damped is suddenly subjected to vibrations caused by for example an earthquake, the stresses produced in the reinforcing members 23 become high so that the quantity of energy to be absorbed is increased and consequently the vibrations of the equipment 26 to be vibration-damped can be immediately interrupted.

Figure 8:
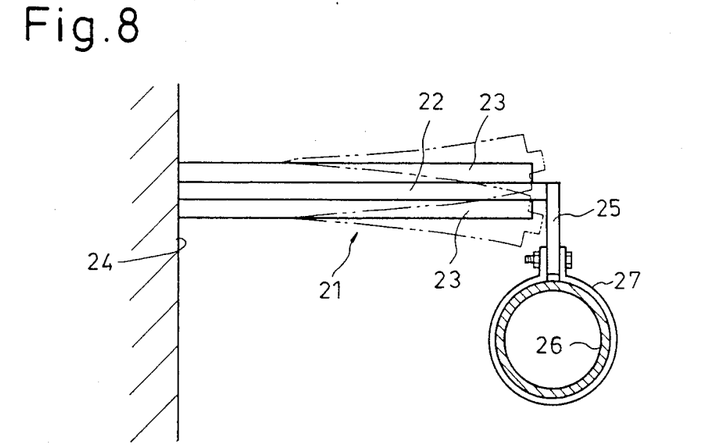
FIG. 8 is a side view used to explain a second embodiment of the present invention.

FIG. 8 shows a second embodiment of the present invention in which the vibration damper 21 extends in the horizontal direction perpendicular to the axis of the equipment 26 to be vibration-damped which is long and extends horizontally. With this arrangement, the vibration damping effect substantially similar to that described in conjunction with the first embodiment can be attained.

Figure 9:
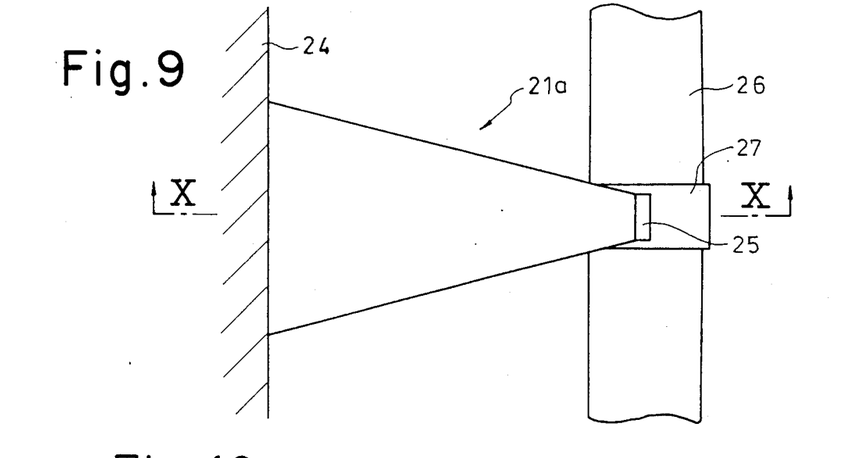
FIG. 9 is a top view thereof.
Figure 10:
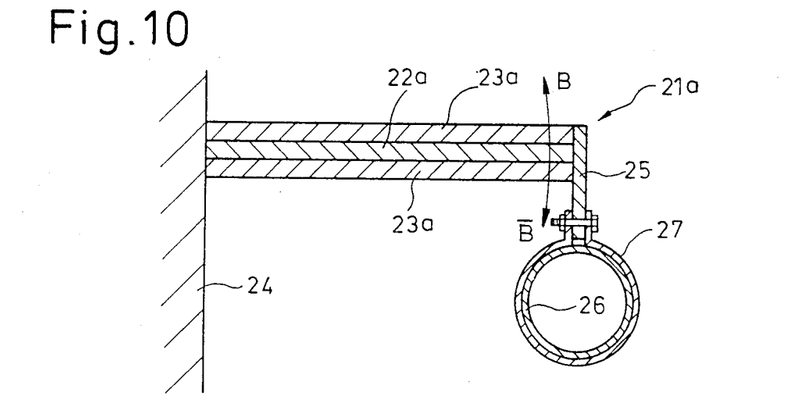
FIG. 10 is a view looking in the direction indicated by X—X of FIG. 9.

FIGS. 9 and 10 show a third embodiment of the present invention. A vibration damper 21a comprises a trapezoidal intermediate member 22a and trapezoidal reinforcing members 23a. Therefore, when the vibration damper 21a is caused to vertically swing as indicated by the double-pointed arrow B—B, the stresses produced at various points in the longitudinal direction of each reinforcing member 23a become uniform in magnitude so that the whole reinforcing members 23a are within an optimum strain rate range, whereby the energy absorption efficient may be increased.

Figure 11:
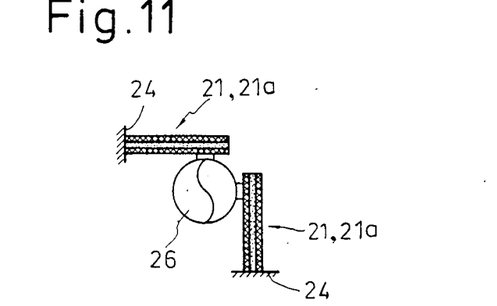
FIG. 11 is a side view used to explain a fourth embodiment of the present invention.

FIG. 11 shows a fourth embodiment of the present invention. One end of the vibration dampers 21 in the form of a rectangle as shown in FIG. 3 or the vibration dampers 21a in the form of a trapezoid as shown in FIG. 9 are attached to the equipment 26 to be vibration-damped such that the vibration dampers 21 or 21a are at right angles with respect to each other. The other ends of the vibration dampers 21 or 21a are securely attached to the support 24. Therefore, the vertical and horizontal vibrations can be damped.

Figure 12:
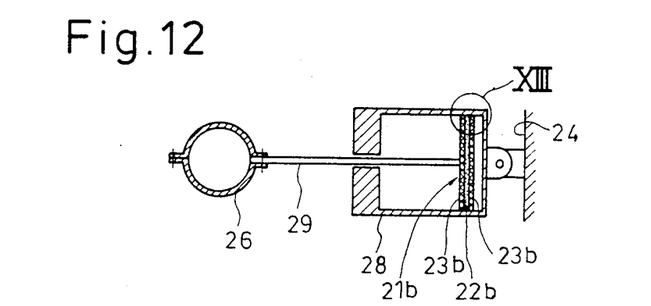
FIG. 12 is a sectional view thereof.
Figures 13, 14:
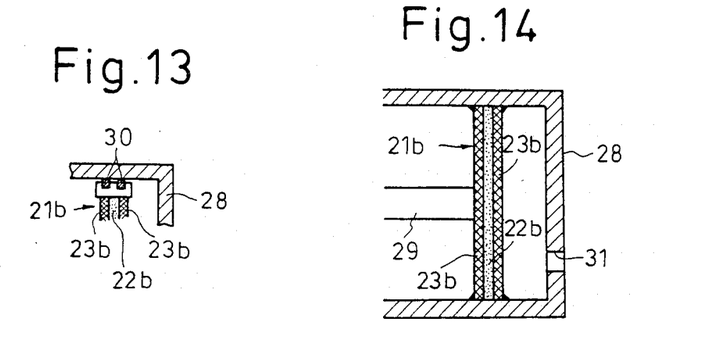
FIG. 13 is a detailed view of a portion indicated by XIII in FIG. 12.
FIG. 14 is a sectional view used to explain a sixth embodiment of the present invention.

FIGS. 12 and 13 show a fifth embodiment of the present invention. In this embodiment, a vibration damper 21b is combined with a pneumatic spring so that the vibration damping effect can be increased. That is, a cylinder 28 is connected to the support 24 and a disk-shaped vibration damper 21b is slidably inserted as a piston into the cylinder 28. The free end of a piston rod 29 attached to the vibration damper 21b is connected to the equipment 26 to be vibration-damped. As in the case of the vibration damper 21 or 21a, the vibration damper 21b comprises an intermediate member 22b and reinforcing members 23b which sandwich the intermediate member 22b. The intermediate and reinforcing members 22b and 23b are made of the above-described materials. O-rings 30 are fitted over the vibration damper 21b.

According to this embodiment, in addition to the damping effect attained by the pneumatic spring, the damping effect of the damper 21b which is used as a piston is attained so that the vibration damping effect can be further increased.

FIG. 14 shows a sixth embodiment of the present invention. While in the fifth embodiment described above with reference to FIGS. 12 and 13, the vibration damper 21b slides within the cylinder 28, the vibration damper 21b according to the sixth embodiment is securely attached to the inner wall of the cylinder 28 and an opening 31 is formed through the bottom wall of the cylinder 28.

FIGS. 15-20 show some modifications of the vibration damper used in the vibration absorption system in accordance with the present invention. Reference numerals 21c, 21d, 21e, 21f, 21g, 21h denote vibration dampers comprising intermediate or core members 22c, 22d, 22e, 22f, 22g and 22h and reinforcing members 23c, 23d, 23e, 23f, 23g and 23h made of the same materials as described above, respectively.

Figure 15:
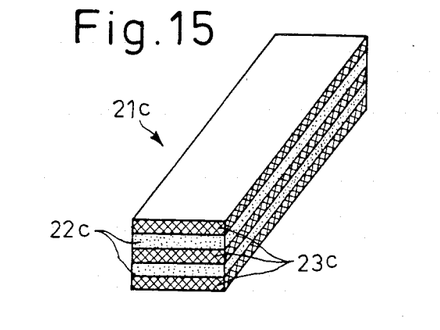
FIGS. 15 through 20 are perspective views of other vibration dampers, respectively, used in the vibration damping system in accordance with the present invention.

With FIG. 15 modification, the rectangular dampers of the type shown in FIG. 3 are laminated to enhance the capability of supporting an equipment to be vibration-damped and the damping effect.

Figure 16:
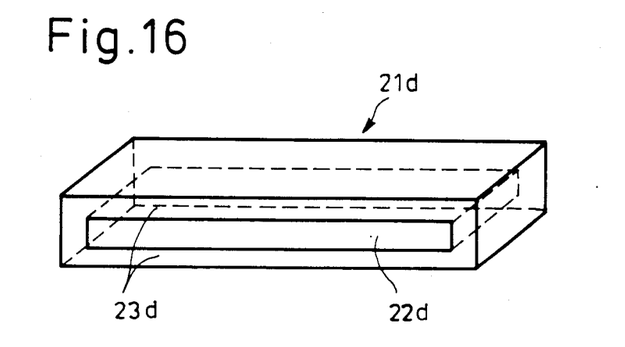

With FIG. 16 modification, the reinforcing member 23d is formed with a through opening into which the intermediate member 22d is inserted.

Figure 17:
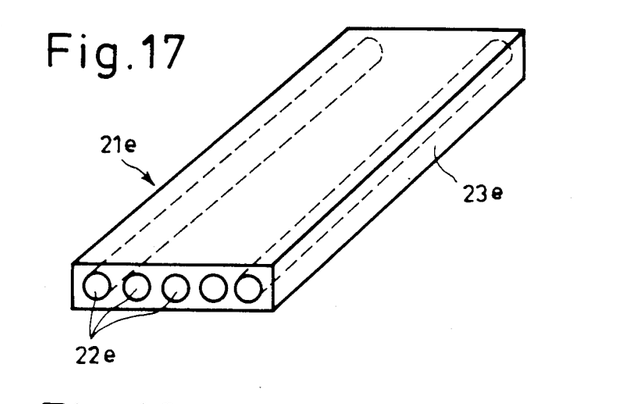

With FIG. 17 modification, the reinforcing member 23e is formed along its width a plurality of screw holes spaced apart from each other and extending along the length of the member 23e. Bolt-like intermediate members 22d are screwed into the screw holes.

Figure 18:
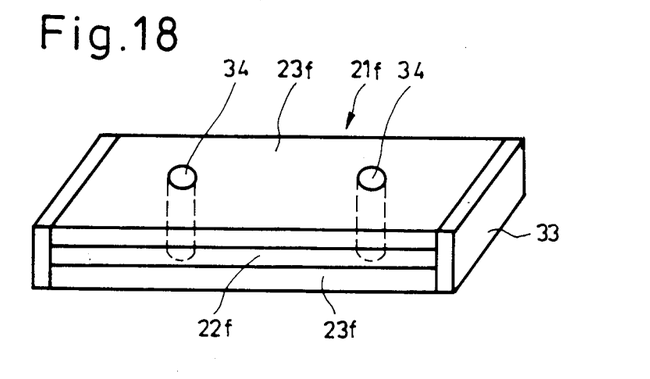

With FIG. 18 embodiment, the reinforcing members 23f are interconnected at their ends by connecting members 33 and the intermediate member 22f is received by a space which is defined by the members 23f. Bolts 34 are screwed into the reinforcing members 23f and the intermediate member 22f for interconnection of these members 22f and 23f.

Figure 19:
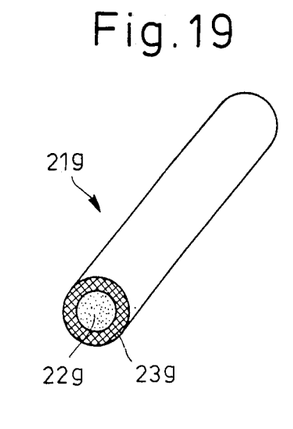

With FIG. 19 modification, the intermediate or core member 22g is in the form of a round rod which is surrounded by the reinforcing member 23g in the form of a cylinder.

Figure 20:
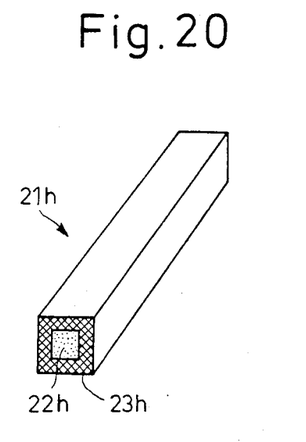

With FIG. 20 modification, the intermediate or core member 22h is in the form of a square rod which is surrounded by the reinforcing member 23h in the form of a square column.

The directions of vibrations of the vibration dampers 21g and 21h are not limited. In other words, they are effective in damping the vibrations in any directions.

Figure 21:
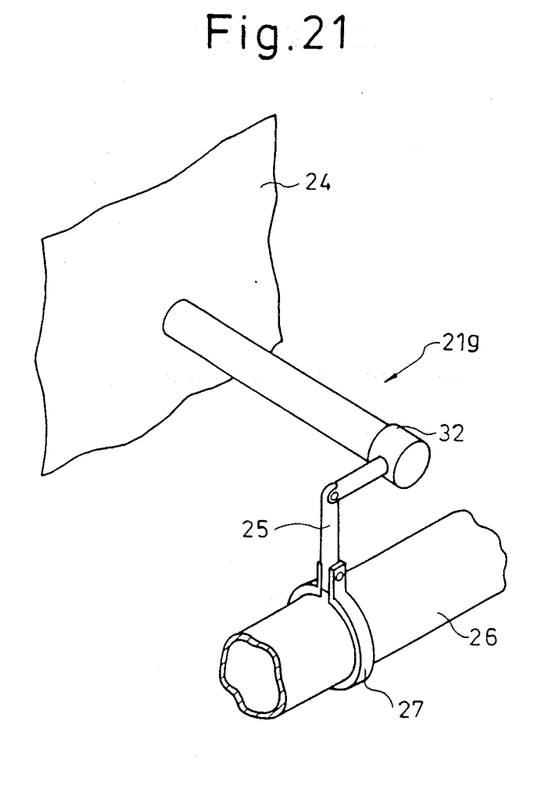
FIG. 21 is a view used to explain a seventh embodiment of the present invention in which the damper as shown in FIG. 19 is utilized.

FIG. 21 shows a seventh embodiment of the present invention in which the vibration damper 21g as shown in FIG. 19 is utilized. One end of the vibration damper 21g is securely attached to the support 24 while the other end is fitted with an auxiliary member 32 which in turn is connected to one end of a connecting member 25 the other end of which is connected to the clamp 27 of the equipment 26 to be vibration-damped.

In this embodiment, upon the vertical vibrations of the equipment 26 to be vibration-damped, torsional strains and stresses are produced in the intermediate or core member 22g and the reinforcing member 23g in their circumferential directions so that vibrations can be damped.

So far the present invention has been described with reference to the preferred embodiments thereof taken in conjunction with the accompanying drawings, but it is to be understood that various modifications may be effected without departing from the true spirit of the present invention. For instance, the intermediate or core member has been described as being made of a leaf spring and the reinforcing members as being made of a superplastic material, but various materials each having a different degree of plastic deformation may be used. Thus, the intermediate or core member may be made of a material having comparatively a high yield point such as plain steel, high tensile steel, spring steel or the like while the reinforcing members may be made of a material having a low yield point such as lead, aluminum, aluminum alloys or the like. Furthermore it is possible to use a superplastic material or a material having a low yield point to fabricate the intermediate or core member while the reinforcing members may be made of a material having a high yield point such as spring steel.

The effects, feature and advantages of the present invention may be summarized as follows:

(1) A superplastic material and a material, except superplastic materials, having a high degree of plastic deformation are combined into a unitary body so that the reaction force produced when the equipment to be vibration-damped is displaced at a low velocity can be decreased and in the case of the sudden displacement of the equipment to be vibration-damped, the large quantity of vibration energy of the equipment can be adsorbed. Therefore when the equipment to be vibration-damped is subjected to sudden vibrations, the vibrations transmitted to the equipment can be rapidly damped.

(2) Oil and complex mechanisms are not needed so that the vibration damping system in accordance with the present invention will not loose its excellent vibration damping capability even after it has been used for a long period of time. Furthermore, breakdown of the system can be substantially eliminated and no maintenance work is needed for a long period of time. In addition, the vibration damping system is simple in construction so that it can be made compact in size and light in weight, thus reducing the fabrication cost.

What is claimed is:

1. A vibration damping system comprising: vibration damper means interposed between an equipment to be vibration-damped and a support for supporting said equipment, said vibration damper means consisting of first bar or plate means made of a metal having a degree of plastic deformation stress, and second bar or plate means unitarily joined to said first bar or plate means and made of a metal having a degree of plastic deformation stress different from that of said first bar or plate means.

2. A system according to claim 1 wherein said materials are a superplastic material and a material plastic deformation stress of which is higher than that of said superplastic material.

3. A system according to claim 1 wherein said materials are a material having a high yield point and a material having a low yield point.

4. A system according to claim 1 wherein said means comprises a plurality of laminated rectangular plates each having a different degree of plastic stress.

5. A system according to claim 1 wherein said means comprises a plurality of laminated rectangular plates each having a different degree of plastic stress.

6. A system according to claim 5 wherein said means comprises a plurality of laminated rectangular plates each having a different degree of plastic stress.

7. A system according to claim 1 wherein said means comprises a plurality of laminated trapezoidal plates each having a different degree of plastic stress.

8. A system according to claim 2 wherein said means comprises a plurality of laminated trapezoidal plates each having a different degree of plastic stress.

9. A system according to claim 3 wherein said means comprises a plurality of laminated tapezoidal plates each having a different degree of plastic deformation.

10. A system according to claim 1 wherein said means comprises a core member and a further member made of material having a plastic deformation stress different from that of said core member, said further member having a through opening for receiving said core member.

11. A system according to claim 2 wherein said means comprises a core member and a further member made of material having a plastic deformation stress different from that of said core member, said further member having a through opening for receiving said core member.

12. A system according to claim 3 wherein said means comprises a core member and a further member made of material having a plastic deformation stress different from that of said core member, said further member having a through opening for receiving said core member.

13. A system according to claim 1 wherein said means comprises core members with threads and a further member made of material having a plastic deformation stress different from that of said core member, said further member having a plurality of screw holes spaced apart from each other along its width and extending along the length of the further member, said core members being screwed into said screw holes.

14. A system according to claim 2 wherein said means comprises core members with threads and a further member made of material having a plastic deformation stress different from that of said core member, said further member having a plurality of screw holes spaced apart from each other along its width and extending along the length of the further member, said core members being screwed into said screw holes.

15. A system according to claim 3 wherein said means comprises core members with threads and a further member made of material having a plastic deformation stress different from that of said core member, said further member having a plurality screw holes spaced apart from each other along its width and extending along the length of the further member, said core members being screwed into said screw holes.

16. A system according to claim 1 wherein said means comprises a core member and a further members made of material having a plastic deformation different from that of said core member, said further members being interconnected at ends thereof by connecting members to define a space therebetween, said core member being received by and fixed in said space.

17. A system according to claim 2 wherein said means comprises a core member and further members made of material having a plastic deformation different from that of said core member, said further members being interconnected at ends thereof by connecting members to define a space therebetween, said core member being received by and fixed in said space.

18. A system according to claim 3 wherein said means comprises a core member and further members made of material having a plastic deformation different from that of said core member, said further members being interconnected at ends thereof by connecting members to define a space therebetween, said core member being received by and fixed in said space.

19. A system according to claim 1 wherein said means comprises a core member and a further member which is fitted over said core member and is made of a material having a plastic deformation stress different from that of said core member.

20. A system according to claim 2 wherein said means comprises a core member and a further member which is fitted over said core member and is made of a material having a plastic deformation stress different from that of said core member.

21. A system according to claim 3 wherein said means comprises a core member and a further member which is fitted over said core member and is made of a material having a plastic deformation stress different from that of said core member.

* * * * *